United States Patent [19]

Coleman

[11] Patent Number: 5,511,885
[45] Date of Patent: Apr. 30, 1996

[54] COMPOSITE FLANGED BEARING HAVING ANTI-ROTATION FEATURE

[75] Inventor: Raymond C. Coleman, Webster, N.Y.

[73] Assignee: Xerox Corporation, Stamford, Conn.

[21] Appl. No.: 198,721

[22] Filed: Feb. 18, 1994

[51] Int. Cl.⁶ .................................... F16C 43/02
[52] U.S. Cl. .................. 384/439; 384/296; 384/539; 384/903; 384/906
[58] Field of Search .................. 384/296, 903, 384/906, 539, 439

[56] References Cited

U.S. PATENT DOCUMENTS

| | | | |
|---|---|---|---|
| 2,339,161 | 1/1944 | Fermier | 384/906 |
| 4,134,175 | 1/1979 | Contoyanis | 16/2 |
| 4,344,658 | 8/1982 | Ledgerwood | 384/903 |
| 4,804,277 | 2/1989 | Counoupas | 384/537 |

Primary Examiner—Lenard A. Footland
Attorney, Agent, or Firm—Kevin R. Kepner

[57] ABSTRACT

A plain flanged bearing or bushing for supporting a rotating shaft in a thin walled frame of an electrophotographic printing machine. The composite bearing has a flanged end and is adapted to be inserted in an opening in a thin walled support member until the flange abuts the surface of the wall. A protruding tab formed by displacing a small portion of the flange extends in an axial direction along the bearing and cooperates with a corresponding opening in the wall to prevent rotation of the bearing. A friction push nut or snap ring is attached to the bearing on the side of the wall opposite the flange. The protruding tab prevents the bearing from rotating about an axis which can cause the bearing to be worn on the exterior surface by rotational contact with the thin wall. A shaft to support idler rolls or other rotating elements is inserted in an inner bore of the bearing and is rotatably supported thereby.

2 Claims, 3 Drawing Sheets

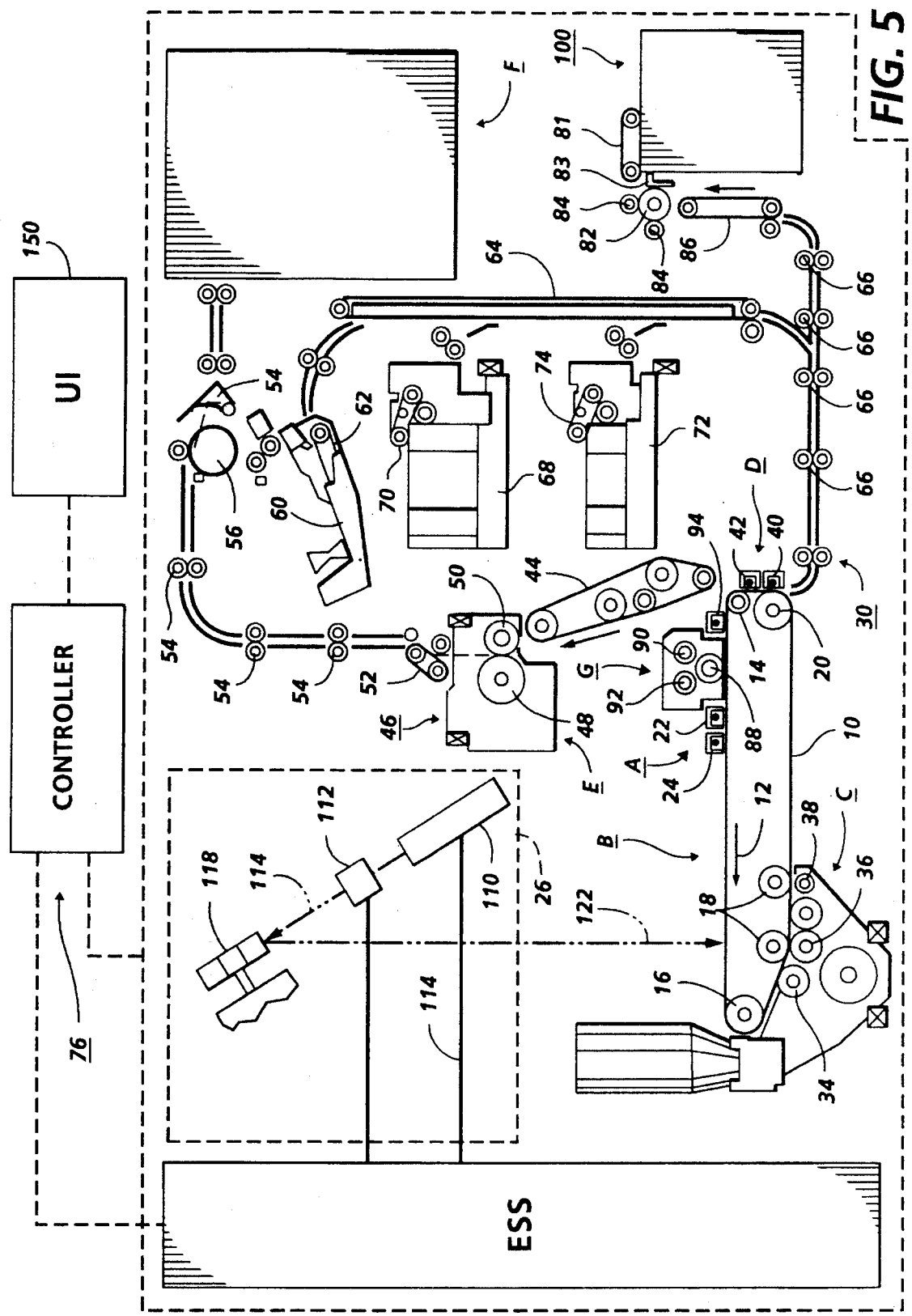

COMPOSITE FLANGED BEARING HAVING ANTI-ROTATION FEATURE

This invention relates generally to sleeve-type plain bearings or bushings and more particularly concerns a flanged cylindrical bearing suitable for mounting in a thin walled panel the bearing having an anti-rotation or anti-spin feature. Typical composite flanged bearings are designed to be pressed into housings to prevent rotation of the bearings and to provide support.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is the n transferred from the photoconductive member to a copy sheet. The toner particles are heated to permanently affix the powder image to the copy sheet.

In modern printing machines such as those described above, it has been increasingly important to develop lighter materials for the framework of the machines. Accordingly, many modern machines utilize a fabricated sheet metal frame resulting in relatively thin walled support structures. Throughout a typical printing machine, there are many shafts, usually utilized to support idler rollers, drive rollers and other rotating shafts which are suitable for being supported in a low pressure velocity coefficient bearing surface such as the typical flanged bearings. However, due to the requirement of typical flanged bearings of a pressed fit into a substantially housing to prevent rotation thereof, these type bearings are unsuitable for use in a thin walled structure. If typical bearings are pressed into the thin wall structure, the bearing tends to spin within the opening which results in quick degradation of the bearing due to the thin wall support cutting through to the bearing surface of the bearing.

It is therefore desirable to provide a low pressure velocity flanged bearing which can be utilized in a thin wall support while still providing high durability.

The following disclosures may be relevant to various aspects of the present invention:

U.S. Pat. No. 4,804,277

Inventor: Counoupas

Issue Date: Feb. 14, 1989

U.S. Pat. No. 4,134,175

Inventor: Contoyanis

Issue Date: Jan. 16, 1979

The relevant portions of the foregoing disclosures may be briefly summarized as follows:

U.S. Pat. No. 4,804,277 describes a bearing mounting system for mounting and retaining a rotatable shaft between first and second bearings mounted to first and second frame members. A first bearing mount rigidly secures a first bearing outer race to a first frame member. A second mount allows axial movement of the second bearing outer race relative to the second frame member but does not allow rotational movement.

U.S. Pat. No. 4,134,175, discloses a non-rotating sleeve-type bushing in which an eccentric flange integral with the bushing and projecting radially outward therefrom is formed so as to be received in a complimentary contoured flanged recess in a bearing housing whereby rotation of the bushing with respect to the bearing housing is precluded.

In accordance with one aspect of the present invention, there is provided a bearing, mounted in a thin wall, for supporting a shaft adapted to rotate. The bearing comprises a cylindrical main body, adapted to be inserted into an opening in the thin wall, defining an axial bore therethrough for supporting the shaft and an annular flange integral with a first end of said main body, said flange abutting the thin wall. An anti-rotation device, integral with said flange, cooperating with the thin wall to prevent rotation of the bearing is also provided.

Pursuant to another aspect of the present invention, there is provided an electrophotographic printing machine having a frame constructed of a thin walled member, and a bearing adapted to support a shaft adapted to rotate. The bearing comprises a cylindrical main body, adapted to be inserted into an opening in the thin wall, defining an axial bore therethrough for supporting the shaft and an annular flange integral with a first end of said main body, said flange abutting the thin wall. An anti-rotation device, integral with said flange, cooperating with the thin wall to prevent rotation of the bearing is also provided.

Other features of the present invention will become apparent as the following description proceeds and upon reference to the drawings, in which.

Figure 1:
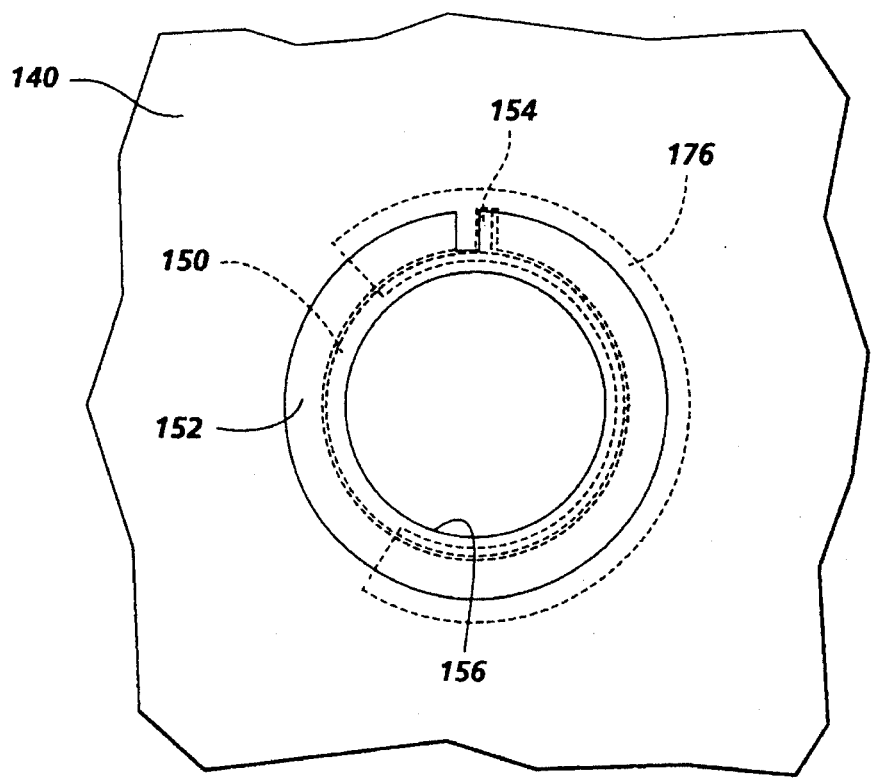
FIG. 1 is a is an elevational view of the mounting scheme for the bearing of the present invention.

FIG. 5 is a schematic elevational view of a typical electrophotographic printing machine utilizing the FIG. 1 bearing therein, While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like reference numerals have been used throughout to identify identical elements. FIG. 5 schematically depicts an electrophotographic printing machine incorporating the features of the present invention therein. It will become evident from the following discussion that the system to extend fuser roll life of the present invention may be employed in a wide variety of devices and is not specifically limited in its application to the particular embodiment depicted herein.

Referring to FIG. 5 of the drawings, the electrophotographic printing machine employs a photoconductive belt 10. Preferably, the photoconductive belt 10 is made from a photoconductive material coated on a ground layer, which, in turn, is coated on an anti-curl backing layer. Belt 10 moves in the direction of arrow 12 to advance successive portions sequentially through the various processing stations disposed about the path of movement thereof. Belt 10 is entrained about stripping roller 14, tensioning roller 16, idler roll 18 and drive roller 20. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential.

Next, the charged portion of the photoconductive surface is advanced through imaging station B. At the imaging station, an imaging module indicated generally by the reference numeral 26, records an electrostatic latent image on the photoconductive surface of the belt 10 Imaging module 26 includes a raster output scanner (ROS). The ROS lays out the electrostatic latent image in a series of horizontal scan lines with each line having a specified number of pixels per inch. Other types of imaging systems may also be used employing, for example, a pivoting or shiftable LED write bar or projection LCD (liquid crystal display) or other electro-optic display as the "write" source.

Here, the imaging module 26 (ROS) includes a laser 110 for generating a collimated beam of monochromatic radiation 120, an electronic subsystem (ESS), located in the machine electronic printing controller 100 that transmits a set of signals via 114 corresponding to a series of pixels to the laser 110 and/or modulator 112, a modulator and beam shaping optics unit 112, which modulates the beam 120 in accordance with the image information received from the ESS, and a rotatable polygon 118 having mirror facets for sweep deflecting the beam 122 into raster scan lines which sequentially expose the surface of the belt 10 at imaging station B.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. The latent image attracts toner particles from the carrier granules of the developer material to form a toner powder image on the photoconductive surface of belt 10. Belt 10 then advances the toner powder image to transfer station D.

At transfer station D), a copy sheet is moved into contact with the toner powder image. First, photoconductive belt 10 is exposed to a pretransfer light from a lamp (not shown) to reduce the attraction between photoconductive belt 10 and the toner powder image. Next, a corona, generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. When duplex solenoid gate 58 diverts the sheet into duplex tray 60. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

The high capacity variable sheet size sheet feeder of the present invention, indicated generally by the reference numeral 100, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Secondary tray 68 and auxiliary tray 72 are secondary sources of copy sheets. Copy sheets are fed to transfer station D from the secondary tray 68 or auxiliary tray 72. Sheet feeders 70, 74 are friction retard feeders utilizing feed belts and take-away rolls to advance successive copy sheets to transport 64 which advances the sheets to rolls 66 and then to transfer station D. The copy sheet is registered just prior to entering transfer station D so that the sheet is aligned to receive the developed image thereon.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls.

The various machine functions are regulated by a controller 76. The controller 76 is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 2A:
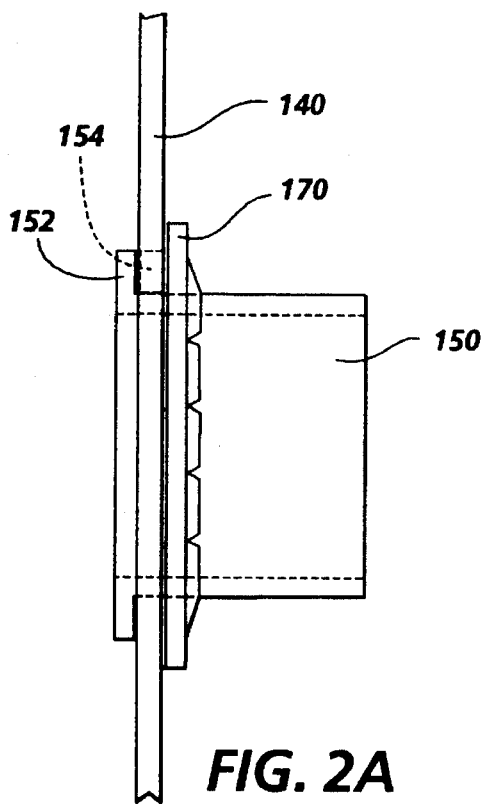
FIGS. 2A and 2B are elevational views of the FIG. 1 bearing mount.
Figure 2B:
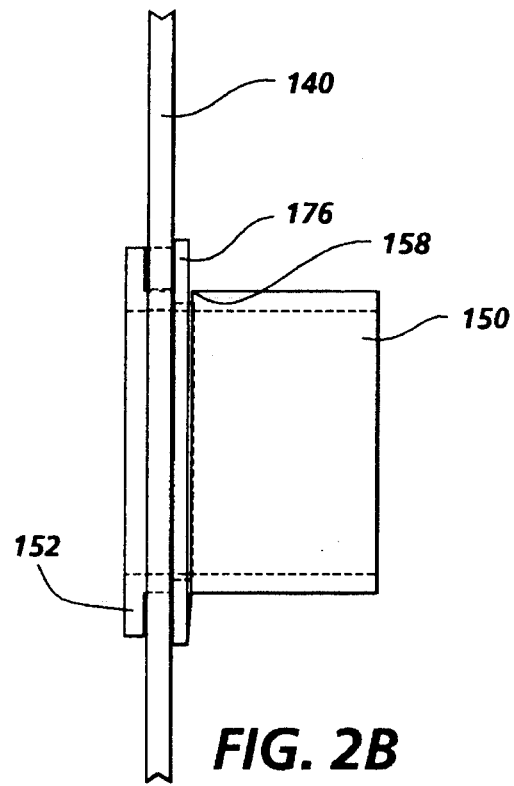

Turning now to FIG. 1, there is illustrated a partial cut-away view of the FIG. 5 printing machine illustrating one of the bearings or bushings of the present invention installed in a thin wall machine frame member 140. FIGS. 2A and 2B are elevational views of the same installation illustrating two different retaining members 170, 176. Looking at FIGS. 1 and 2A and 2B, the bearing is a generally cylindrical shaped member 150 having an annular flange 152 located at one end of the cylindrical portion. Bearing 150 is inserted into the thin wall 140 until the annular flange 152 abuts one surface of the thin walled member 140. A rotation restraining tab 154 is formed by displacing a portion of the annular flange 152 in a direction parallel to the axis of the bearing 150. This displaced tab 154 cooperates with a slot or other opening in the thin wall member 140 to prevent the bearing 150 from rotating about its axis. A retaining member in the form of a push nut 170 can be installed from the end opposite the flanged end of the bearing. The push nut is inserted over the bearing until it abuts the opposite side of the thin walled member 140 so as to secure the bearing into the thin walled member. The bearing has an internal bore 156 which supports a rotating shaft which may be used for idler rollers, drive rollers, belt rollers or any other use for a rotating shaft within the printing machines. Typically, these bearings are constructed in a composite manner with a typical construction consisting of several layers in which the outer backing may be of a steel or bronze materials with a second layer typically of a bronze and a third sliding layer composed of a material such as polytetrafluoreethylene (PTFE) and lead (Pb) so as to provide a relatively frictionless bearing surface.

FIG. 2B illustrates a second securing method in which a groove is formed in the outer surface of the bearing or bearing 150. The groove 158 is located so that a snap ring 176 is inserted into the groove 158 after the bearing is inserted into the opening in the thin walled member 140. The snap ring 176 then prevents the bearing 150 from moving axially toward the opposite surface of the thin walled member 140. The bearing 150 can also be held in place by a feature such as an E-ring on the shaft which is inserted into the bearing or by a stepped portion formed into the shaft.

Figure 3:
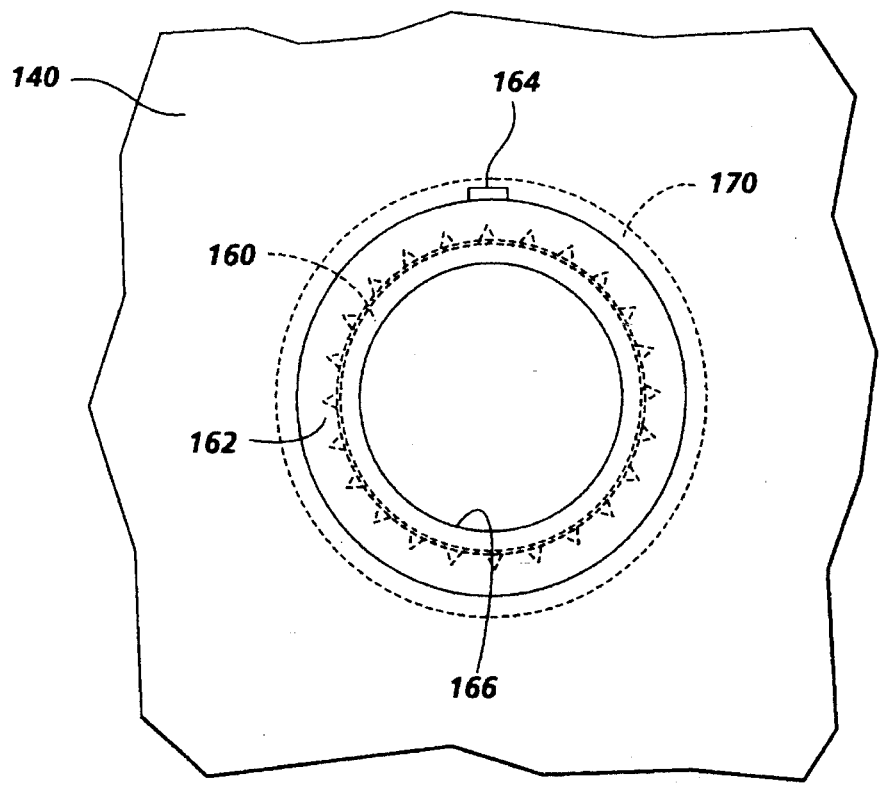
FIG. 3 is an elevational view of a second embodiment of the non-rotating bearing.
Figure 4:
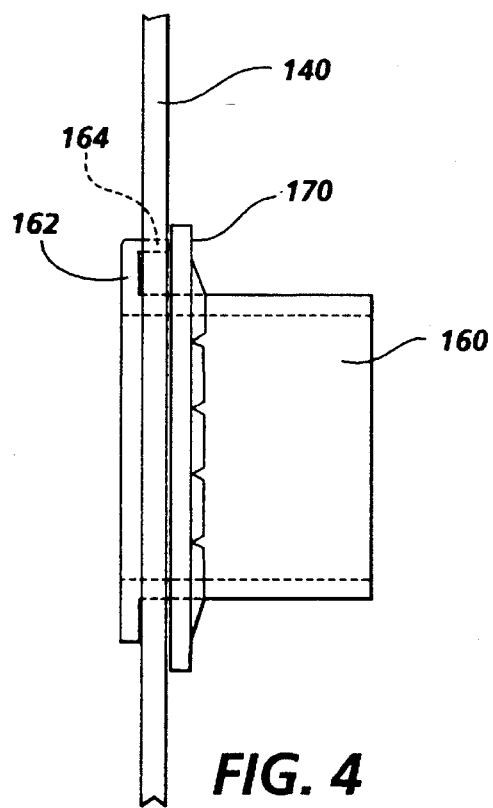
FIG. 4 is an elevational view of the FIG. 3 bearing.

A second configuration is illustrated in FIGS. 3 and 4 in which the rotation preventing tab member is an extension extending outwardly from the annular flange 162 and bent in a direction parallel to the axis of the bearing 160. This tab 164 serves to prevent rotation of the bearing 160 about an axis in the same manner as the displaced tab previously discussed.

The bearing described herein is easily mounted and can be replaced without the necessity of complex disassembly of many components. Due to the unique anti-rotation feature a tight press fit is not required to prevent rotation and subsequent failure of the bearing as a result thereof.

In recapitulation, there is provided a plain flanged bearing or bearing for supporting a rotating shaft in a thin walled frame of an electrophotographic printing machine. The composite bearing has a flanged end and is adapted to be inserted in an opening in a thin walled support member until the flange abuts the surface of the wall. A protruding tab formed by displacing a small portion of the flange extends in an axial direction along the bearing and cooperates with a corresponding opening in the wall to prevent rotation of the bearing. A friction push nut or snap ring is attached to the bearing on the side of the wall opposite the flange. The protruding tab prevents the bearing from rotating about an axis which can cause the bearing to be worn on the exterior surface by rotational contact with the thin wall. A shaft to support idler rolls or other rotating elements is inserted in an inner bore of the bearing and is rotatably supported thereby.

It is, therefore, apparent that there has been provided in accordance with the present invention, a bearing that fully satisfies the, aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A bearing mounted in a thin wall, for supporting a shaft adapted to rotate, comprising:

a cylindrical main body, adapted to be inserted into an opening in the thin wall, defining an axial bore therethrough for supporting the shaft;

an annular flange integral with a first end of said main body, said flange abutting the thin wall;

an anti-rotation device, integral with said flange, cooperating with the thin wall to prevent rotation of the bearing; and an attachment device to secure the bearing to the thin wall to prevent the bearing from moving in a direction substantially perpendicular to said flange, wherein said attachment device comprises a friction push nut in sliding engagement with said main body to secure the bearing to the thin wall.

2. An electrophotographic printing machine having a frame constructed of a thin walled member, and a bearing adapted to support a shaft adapted to rotate, the bearing comprising:

a cylindrical main body, adapted to be inserted into an opening in the thin wall, defining an axial bore therethrouqh for supporting the shaft;

an annular flange integral with a first end of said main body, said flange abutting the thin wall;

an anti-rotation device, integral with said flange, cooperating with the thin wall to prevent rotation of,the bearing; and an attachment device to secure the bearing to the thin wall to prevent the bearing from moving in a direction substantially perpendicular to said flange, wherein said attachment device comprises a friction push nut in sliding engagement with said main body to secure the bearing to the thin wall.

\* \* \* \* \*